(12) United States Patent
Olm et al.

(10) Patent No.: US 10,059,442 B2
(45) Date of Patent: Aug. 28, 2018

(54) VERTICAL TAKEOFF AND LANDING UNMANNED AIRCRAFT SYSTEM

(71) Applicants: Orville Olm, Saskatoon (CA); Zenon Dragan, Saskatoon (CA)

(72) Inventors: Orville Olm, Saskatoon (CA); Zenon Dragan, Saskatoon (CA)

(73) Assignee: Zenon Dragan, Saskatoon, SK (CA)

( * ) Notice: Subject to any disclaimer, the term of this patent is extended or adjusted under 35 U.S.C. 154(b) by 252 days.

(21) Appl. No.: 15/164,718

(22) Filed: May 25, 2016

(65) Prior Publication Data

US 2017/0008625 A1    Jan. 12, 2017

Related U.S. Application Data

(60) Provisional application No. 62/191,132, filed on Jul. 10, 2015.

(51) Int. Cl.
| | |
|---|---|
| *B64C 29/02* | (2006.01) |
| *B64C 3/56* | (2006.01) |
| *B64C 39/12* | (2006.01) |
| *B64C 39/02* | (2006.01) |

(52) U.S. Cl.
CPC .............. *B64C 29/02* (2013.01); *B64C 3/56* (2013.01); *B64C 39/024* (2013.01); *B64C 39/12* (2013.01); *B64C 2201/021* (2013.01); *B64C 2201/088* (2013.01); *B64C 2201/102* (2013.01); *B64C 2201/108* (2013.01); *B64C 2201/128* (2013.01); *B64C 2201/162* (2013.01); *B64C 2201/20* (2013.01); *Y02T 50/145* (2013.01)

(58) Field of Classification Search
CPC ........... B64C 29/02; B64C 29/04; B64C 3/56; B64C 3/42; B64C 39/12; B64C 23/072; B64C 2201/102; B64C 2201/088
See application file for complete search history.

(56) References Cited

U.S. PATENT DOCUMENTS

| 9,481,457 B2 * | 11/2016 | Alber ....................... B64C 29/02 |
| 9,550,567 B1 * | 1/2017 | Erdozain, Jr. ........... B64C 29/02 |
| 9,650,133 B2 * | 5/2017 | Fisher ..................... B64C 29/02 |
| 2016/0378120 A1 * | 12/2016 | Creasman ............... B64C 29/02 701/2 |

FOREIGN PATENT DOCUMENTS

FR    677366 A  *  3/1930  ............. B64C 29/02

* cited by examiner

*Primary Examiner* — Richard R Green
(74) *Attorney, Agent, or Firm* — Suiter Swantz pc llo

(57) ABSTRACT

A vertical takeoff and landing (VTOL) unmanned aircraft system (UAS) may be uniquely capable of VTOL via a folded wing design while also configured for powered flight as the wings are extended. In a powered flight regime with wings extended, the VTOL UAS may maintain controlled powered flight as a twin pusher canard design. In a zero airspeed (or near zero airspeed) nose up attitude in a VTOL flight regime with the wings folded, the unmanned aircraft system may maintain controlled flight using main engine thrust as well as vectored thrust as a vertical takeoff and landing aircraft. An airborne transition from VTOL flight regime to powered flight and vice versa may allow the VTOL UAS continuous controlled flight in each regime.

20 Claims, 15 Drawing Sheets

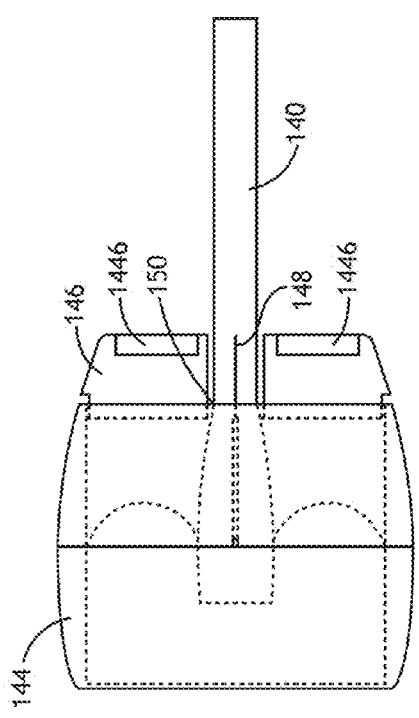
FIG. 14B
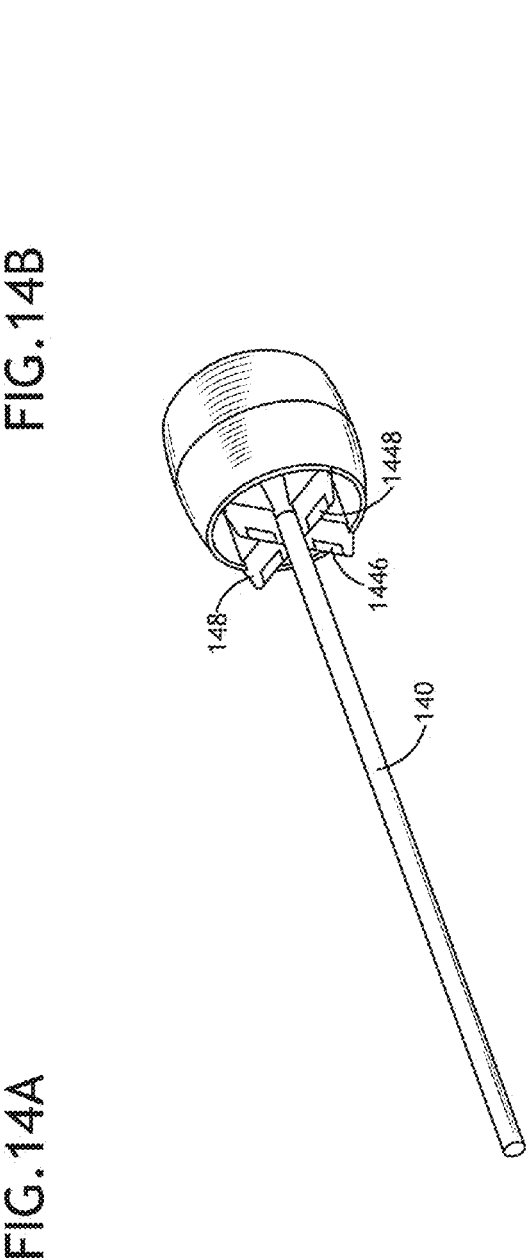
FIG. 14C
FIG. 14A

VERTICAL TAKEOFF AND LANDING UNMANNED AIRCRAFT SYSTEM

CROSS-REFERENCE TO RELATED APPLICATIONS

The present application claims the benefit under 35 U.S.C. § 119(e) of U.S. Provisional Application 62/191,132 filed Jul. 10, 2015 entitled "Vertical Takeoff and Landing Unmanned Aircraft System" which is incorporated by reference in its entirety.

FIELD OF THE INVENTION

Embodiments of the inventive concepts disclosed herein relate generally to Unmanned Aircraft Systems (UAS). More particularly, embodiments of the inventive concepts disclosed herein relate to an unmanned aircraft system and device configured for a unique folded wing vertical takeoff and landing and a controlled transition to and from a vertical flight regime and a powered flight regime.

BACKGROUND

Traditional unmanned aircraft systems may operate in one flight regime only; a powered flight regime or a vertical flight regime. This limitation presents limits on range, endurance, altitude and overall performance.

Some traditional vertical takeoff and landing (VTOL) systems may launch in the vertical flight regime and make the transition to the powered flight regime and vice versa. However, these systems may be limited to complex thrust vectoring systems and rotating engines capable only of a change in vectored thrust to maintain controlled flight in the vertical flight regime and limited endurance while flying in the powered flight regime.

Therefore, a need remains for an unmanned aircraft system capable of a VTOL launch in a folded wing configuration, transitioning to a powered flight configuration, flying in the powered flight regime for increased endurance, and a VTOL recovery in the folded wing configuration.

SUMMARY

In one aspect, embodiments of the inventive concepts disclosed herein are directed to a vertical takeoff and landing unmanned aircraft system (VTOL UAS). The VTOL UAS may comprise a center wing including a fuselage, the fuselage configured for receiving and removably coupling with a removable payload pod, a left power pod coupled to a left tip of the center wing, the left power pod having a left power pod stand, and a right power pod coupled to a right tip of the center wing, the right power pod having a right power pod stand.

The VTOL UAS may include a left foldable wing rotatably coupled to the left power pod, the left foldable wing having a left wing stand coupled with a left wing tip of the left foldable wing, the left foldable wing including a left aileron, a right foldable wing rotatably coupled to the right power pod, the right foldable wing having a right wing stand coupled with a right wing tip of the right foldable wing, the right foldable wing including a right aileron, the VTOL UAS having a lateral axis, a vertical axis and a longitudinal axis, a trailing edge of each of the left wing stand, the right wing stand, the left power pod stand and the right power pod stand being longitudinally equal.

The VTOL UAS may also include a canard boom removably coupled to a leading edge of the fuselage, a control power pod coupled with a leading edge of the canard boom, the control power pod configured for vectoring a thrust produced by the control power pod, the left power pod, the right power pod, and the control power pod configured for providing a combined thrust greater than the weight of the VTOL UAS, the canard boom extending longitudinally from the fuselage to the control power pod, a canard coupled with the control power pod.

In embodiments, the VTOL UAS is configured for a powered flight regime in a powered flight configuration, the powered flight configuration a substantially linear lateral wing configuration including a substantially linear lateral alignment of the center wing, the left foldable wing and the right foldable wing along the lateral axis. The VTOL UAS is also configured for a VTOL flight regime in a VTOL configuration, the VTOL configuration including a folded wing configuration wherein each of the left foldable wing and the right foldable wing is rotated in an equal clock direction about the longitudinal axis to an angle in which the left wing stand and the right wing stand substantially align with the fuselage along the vertical axis.

The VTOL UAS may also be configured for maintaining a stationary nose up position on a landing surface while in the VTOL configuration, a takeoff the in the VTOL flight regime while in the VTOL configuration, a steady state hover in the VTOL flight regime, a transition from the VTOL configuration to the powered flight configuration during the takeoff, a transition from the VTOL flight regime to the powered flight regime, a steady state flight in the powered flight regime, a transition from the powered flight regime to the VTOL flight regime, a transition from the powered flight configuration to the VTOL configuration, and a landing in the VTOL flight regime while in the VTOL configuration.

An additional aspect of the inventive concepts disclosed herein may include a system wherein each of the left power pod, the right power pod, and the control power pod are comprised of a ducted fan and/or a ducted propeller engine enclosed within a cylindrical duct; each cylindrical duct may be configured as a lifting airfoil during the powered flight regime.

An additional aspect of the inventive concepts disclosed herein may include a system wherein the left foldable wing and the right foldable wing have a mean aerodynamic chord (MAC) of approximately six inches, the center wing has a MAC of approximately eight inches, and each of the left and right foldable wings and the center wing is comprised of a an airfoil having a thickness of approximately 7.3% MAC at approximately 30% chord and a maximum camber of approximately 3.9% MAC at approximately 45% chord.

An additional aspect of the inventive concepts disclosed herein may include a system wherein the center wing, the left foldable wing, and the right foldable wing present a high aspect ratio of one of greater than 20 and approximately 24 while in the powered flight configuration.

An additional aspect of the inventive concepts disclosed herein may include a system wherein: the powered flight regime includes lift produced by the left foldable wing, the right foldable wing, and the center wing and further includes thrust produced by each of the left power pod, the right power pod and the control power pod; and the VTOL flight regime includes vertical thrust and lift produced by each of the left power pod, the right power pod and the control power pod.

An additional aspect of the inventive concepts disclosed herein may include a system further including at least four vectored thrust vanes coupled to a trailing edge of the control power pod and configured for powered displacement to vector the thrust from the control power pod. In this embodiment, the control power pod is securely coupled with the leading edge of the canard boom and the vectored thrust vanes are able to adequately vector the thrust from the control power pod to provide pitch and yaw stability during the VTOL flight regime. Also in this configuration, at least one ducteron may be coupled to a trailing edge of each of the left power pod and the right power pod for roll control during the VTOL flight regime.

An additional aspect of the inventive concepts disclosed herein may include a system wherein the control power pod is articulatingly coupled with the leading edge of the canard boom and is configured for angular displacement from the longitudinal axis of the VTOL UAS.

An additional aspect of the inventive concepts disclosed herein may include a system wherein the control power pod articulatingly coupled with a leading edge of the canard boom further includes at least four vectored thrust vanes coupled to a trailing edge of the control power pod and configured for powered displacement to angularly displace the control power pod from the longitudinal axis to 1) vector the thrust from the control power pod, and 2) change an angle of attack of the canard.

An additional aspect of the inventive concepts disclosed herein may include a system wherein the control power pod articulatingly coupled with a leading edge of the canard boom further includes at least four servo tabs integrated with a trailing edge of the at least four vectored thrust vanes, the at least four servo tabs configured to displace the at least four vectored thrust vanes.

An additional aspect of the inventive concepts disclosed herein may include a system wherein the control power pod coupled with a leading edge of the canard boom further includes a powered articulating system configured for angularly displacing the control power pod from the longitudinal axis.

An additional aspect of the inventive concepts disclosed herein may include a system further including an autopilot configured for receiving an input from an offboard controller, an onboard pitot static system, an onboard positioning system, an onboard memory and processor, and an onboard accelerometer, the autopilot further configured for controlling the thrust of each of the power pods, displacing each of the ailerons, and displacing the control power pod and canard to maintain controlled flight in each of the powered flight regime and the VTOL flight regime.

An additional aspect of the inventive concepts disclosed herein may include a system wherein the VTOL UAS is further configured for an assisted takeoff in the powered flight configuration via at least one of: a catapult device, a removable wheel configuration, a launch from a specific above ground level altitude, and a removable skid system.

An additional aspect of the inventive concepts disclosed herein may include a system further including a disassembled configuration wherein the left foldable wing and the right foldable wing are rotated about the longitudinal axis to a position proximal to the fuselage, and the canard boom removably coupled to the leading edge of the fuselage is removed.

An additional aspect of the inventive concepts disclosed herein may include a method for launching a vertical takeoff and landing (VTOL) unmanned aircraft system (UAS). The method may comprise maintaining a stationary nose up position on a landing surface while in a VTOL configuration, the VTOL configuration including a folded wing configuration wherein each of a left foldable wing and a right foldable wing is rotated in an equal clock direction about a longitudinal axis to an angle in which a left wing stand and a right wing stand substantially align with a fuselage along a vertical axis.

The method may include launching in a VTOL flight regime while in the VTOL configuration, hovering while in the VTOL flight regime, transitioning from the VTOL configuration to a powered flight configuration during the launching, the powered flight configuration a substantially linear lateral wing configuration including a substantially linear lateral alignment of a center wing, the left foldable wing and the right foldable wing along a lateral axis.

The method may further include transitioning from the VTOL flight regime to a powered flight regime, maintaining a steady state flight in the powered flight regime, transitioning from the powered flight regime to the VTOL flight regime, transitioning from the powered flight configuration to the VTOL configuration, and landing in the VTOL flight regime while in the VTOL configuration.

An additional aspect of the inventive concepts disclosed herein may include a method wherein the launching in a VTOL flight regime further comprises a controlled vertical takeoff using a constant thrust from a left power pod and a right power pod, and vectored thrust from a control power pod, the left power pod coupled to a left tip of the center wing, the left power pod having a left power pod stand, the right power pod coupled to a right tip of the center wing, the right power pod having a right power pod stand, and a control power pod is coupled with a leading edge of a canard boom, the control power pod configured for vectoring a thrust produced by the control power pod.

An additional aspect of the inventive concepts disclosed herein may include a method wherein transitioning from the VTOL configuration to a powered flight configuration during the launching further comprises rotating the left foldable wing and the right foldable wing from the VTOL configuration to the powered flight configuration.

An additional aspect of the inventive concepts disclosed herein may include a method wherein transitioning from the VTOL flight regime to a powered flight regime further comprises a nose down moment of a vectored thrust from the control power pod and an increase in airspeed from approximately zero to above a stall speed of the VTOL UAS.

An additional aspect of the inventive concepts disclosed herein may include a method wherein transitioning from the powered flight regime to the VTOL flight regime further comprises a deep stall of the VTOL UAS and a decrease in airspeed from above the stall speed of the VTOL UAS to approximately zero.

An additional aspect of the inventive concepts disclosed herein may include a method wherein transitioning from the powered flight configuration to the VTOL configuration further comprises rotating each of the left foldable wing and the right foldable wing from the powered flight configuration to the VTOL configuration.

An additional aspect of the inventive concepts disclosed herein may include a method wherein landing in the VTOL flight regime while in the VTOL configuration further comprises a nose up attitude of the VTOL UAS and a nose up descent to the stationary nose up position on the landing surface.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the inventive concepts disclosed herein may be better understood by those skilled in the art by reference to the accompanying figures in which:

FIGS. 14A-14C are views of a control power pod and associated vectored thrust devices in accordance with one embodiment of the inventive concepts disclosed herein.

DETAILED DESCRIPTION

Reference will now be made in detail to the presently preferred embodiments of the invention, examples of which are illustrated in the accompanying drawings. The following description presents certain specific embodiments of the inventive concepts disclosed herein. However, the inventive concepts disclosed herein may be embodied in a multitude of different ways. In this description, reference is made to the drawings wherein like parts are designated throughout.

Overview

Embodiments of the inventive concepts disclosed herein are directed to a device and related system for a Vertical Takeoff and Landing (VTOL) Unmanned Aircraft System (UAS) capable of vertical launch and recovery via a unique folded wing design. The VTOL UAS may be uniquely capable of VTOL via sufficient vertical thrust while also capable of powered flight as the wings produce lift. In a powered flight regime, the VTOL UAS may maintain controlled powered flight as a twin pusher canard design while in a zero airspeed (or near zero airspeed) nose up attitude. In a VTOL flight regime, the VTOL UAS may maintain controlled flight using vectored thrust from three power pods as a vertical takeoff and landing aircraft. An airborne transition from VTOL flight regime to powered flight and vice versa may allow the VTOL UAS continuous controlled flight in each regime.

| Reference Chart | |
|---|---|
| Ref. No. | Description |
| 100 | VTOL UAS |
| 110 | Center Wing |
| 112 | Fuselage |
| 114 | Payload Pod |
| 120 | Left Foldable Wing |
| 122 | Left Aileron |
| 124 | Left Wingtip Stand |
| 126 | Left Power Pod |
| 126A | Left Forward Duct |
| 126B | Left Aft Duct |
| 128 | Left Power Pod Stand |
| 130 | Right Foldable Wing |
| 132 | Right Aileron |
| 134 | Right Wingtip Stand |
| 136 | Right Power Pod |
| 136A | Right Forward Duct |
| 136B | Right Aft Duct |
| 138 | Right Power Pod Stand |
| 140 | Canard Boom |
| 142 | Canard |
| 144 | Control Power Pod |
| 146 | Vertical Vectored Thrust Vanes |
| 148 | Horizontal Vectored Thrust Vanes |
| 150 | Universal attachment |
| 200 | Powered Flight Configuration |
| 250 | Longitudinal Axis |
| 252 | Lateral Axis |
| 254 | Vertical Axis |
| 500 | VTOL UAS Un-ducted power pod system |
| 600 | VTOL configuration |
| 610 | Landing Surface |
| 700 | VTOL configuration vertical view |
| 722 | Left Ducteron |
| 732 | Right Ducteron |
| 800 | VTOL UAS Disassembled Configuration |
| 1210 | Ducted Fan |
| 1446 | Vertical Vectored Thrust Servo Tab |
| 1448 | Horizontal Vectored Thrust Servo Tab |
| 1514 | Payload Pod Aerodynamic |
| 1520 | Removable Battery Pack |
| 1522 | Removable Sensor Pack |
| 1524 | Removable Alternate Pack |

Figure 1:
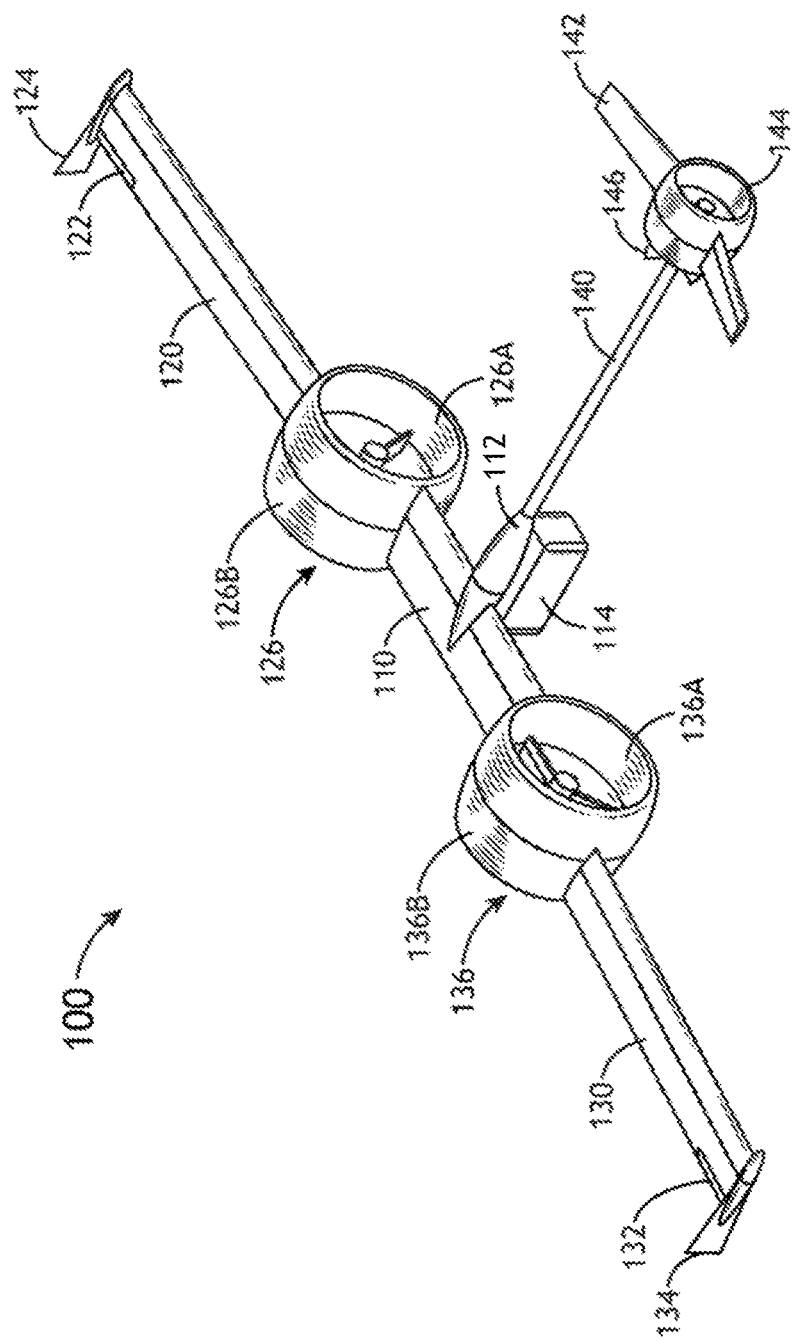
FIG. 1 is a diagram of a VTOL UAS in a powered flight configuration in accordance with an embodiment of the inventive concepts disclosed herein.

Referring to FIG. 1, a diagram of a VTOL UAS in a powered flight configuration in accordance with an embodiment of the inventive concepts disclosed herein is shown. The VTOL UAS 100 may comprise a center wing 110 including a fuselage 112 centrally positioned on a leading edge of the center wing 110. Removably coupled with the fuselage, a detachable payload pod 114 may function as an operational sensor and battery source for the VTOL UAS 100.

Outboard from the center wing 110, the VTOL UAS 100 may include a left power pod 126 including a left forward duct 126A and a left aft duct 126B. The VTOL UAS 100 may include a left foldable wing 120 with an associated left aileron 122 and a left wingtip stand 124. Symmetrically opposite and on the right side of the VTOL UAS 100, a right power pod 136 including a right forward duct 136A and a right aft duct 136B may be coupled with a right foldable wing 130 including a right aileron 132 and a right wing stand 134.

Forward of the fuselage 112, a detachable control power pod 144 may include a canard boom 140, a control power pod 144, and a forward canard 142. Vertical vectored thrust vanes 146 and horizontal vectored thrust vanes 148 may be coupled with a trailing edge of the control power pod 144 offering a vectored thrust capability of the control power pod 144.

The VTOL UAS 100 may maintain a configuration in any position between three described configurations: 1) a powered flight configuration 200 (see FIG. 2) may include a design in which wings 120 and 130 of the VTOL UAS 100 are extended and capable of providing lift for powered flight; 2) a VTOL configuration 600 (see FIG. 6) may include a folded wing design where each wing 120 and 130 is longitudinally and oppositely folded in a counter or clockwise direction, the power pods 126 and 136 provide vertical thrust as the source of lift while the wings 120 and 130 and wing stands 124 and 134 provide a stable platform for a vertical takeoff and landing; and 3) a disassembled configuration 800 (see FIG. 8) may include a design where the foldable wings are positioned proximal to the opposite power pod (e.g. the left foldable wing 120 is folded proximal to right power pod 136 ) and the VTOL UAS 100 is partially disassembled and configured for small form factor unpowered transport.

Figure 2:
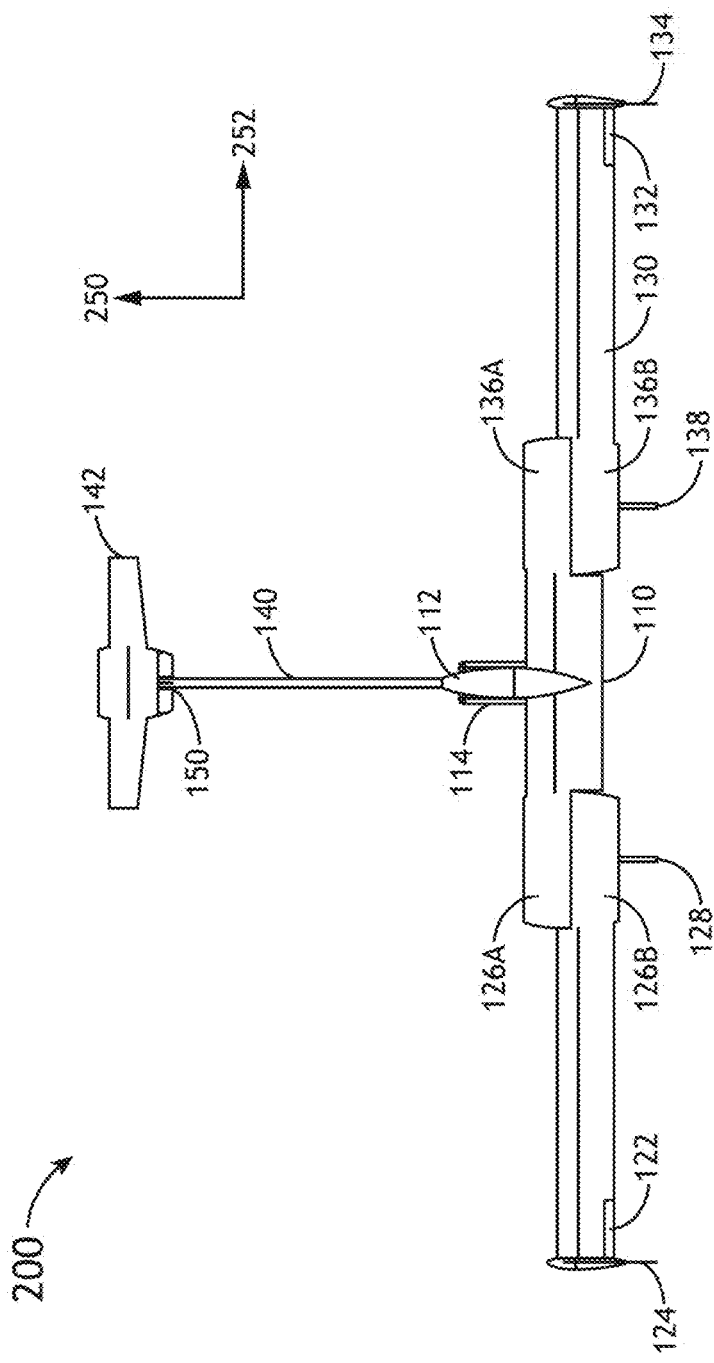
FIG. 2 is a vertical view of the VTOL UAS in a powered flight configuration in accordance with an embodiment of the inventive concepts disclosed herein.

Referring to FIG. 2, a vertical view of the VTOL UAS in a powered flight configuration in accordance with an embodiment of the inventive concepts disclosed herein is shown. In the powered flight configuration 200, the VTOL UAS 100 may operate similarly to a conventional twin pusher canard design aircraft. The left foldable wing 120 and the right foldable wing 130 may be rotated to a position substantially linear with a lateral axis 252. The left and right power pods 126 and 136 and the control power pod 144 may provide horizontal thrust to enable the VTOL UAS 100 to achieve sufficient airspeed above a stall speed of the VTOL UAS 100 to remain in airfoil supported powered flight.

The left aileron 122 and right aileron 132 may enable the VTOL UAS 100 sufficient roll capability and control while in the powered flight configuration 200. The outboard placement of the ailerons 122 and 132 may enable a smaller size of each aileron for the desired roll moment and roll effect. It is further contemplated, the ailerons 122 and 132 may be placed at a plurality of locations along the trailing edge of each wing 120 and 130 for desired performance.

The canard 142 may operate to provide pitch control via the vectored thrust capability of the control power pod 144. In one embodiment, the canard 142 is securely coupled with the control power pod 144 and functions to increase and decrease the angle of attack of the canard 142 as the control power pod 144 is articulated about a universal attachment 150 where the control power pod 144 may be securely coupled or articulatingly coupled with the canard boom 140. Without power applied to the control power pod 144, the universal attachment 150 may allow the control power pod 144 to float a maximum deflection in any direction from the longitudinal axis 250. As the vertical vectored thrust vanes 146 may be positively deflected, the deflection may operate to 1) vector the thrust from the control power pod 144 and deflect the entire control power pod 144 in a desired direction, and/or 2) change the angle of attack of the control power pod 144 and thus control the angle of attack of the canard 142. Optionally, powered elevators may be configured within a trailing edge of the canard 142 for additional pitch stability.

As an alternative design to the vectored thrust vanes 146 and 148, the universal attachment 150 between the canard boom 140 and the control power pod 144 may include a plurality of articulating servos internal to the canard boom 140 configured to act upon the control power pod 144 to direct the thrust of the control power pod 144 at any desired angle from the longitudinal axis 250 of the VTOL UAS 100. This positive direction of the control power pod 144 has the effect of deflecting the canard 142 as well. Alternately, the control power pod 144 and forward canard 142 assembly may be attached to the canard boom 140 with the universal attachment 150 allowing the control power pod 144 to freely point in any direction with respect to the longitudinal axis of the VTOL UAS. The vertical and horizontal vectored thrust vanes 146 and 148 may be reduced in size and would operate as "servo tabs" to move the control power pod 144 relative to the canard boom 140 in any vector direction desired for control. This configuration would require less 'muscle' in order to move the control power pod 144 relative to the canard boom 140.

Preferably, the VTOL UAS 100 may control yaw in the powered flight configuration 200 via the vectored thrust capability of the control power pod 144. As the vertical vectored thrust vanes 146 may deflect, the thrust from the control power pod 144 may also be deflected away from the longitudinal axis 152. In addition, the wingtip stands 124 and 134 may act as airfoils to offer an additional degree of yaw stability in the powered flight regime. Also contemplated herein, a variable thrust control of each of the left and right power pods 126 and 136 may offer yaw control while in the powered flight configuration 200.

In an additional embodiment, each of the left and right power pods may provide sufficient thrust for powered flight while the control power pod 144 propeller may be feathered (zero angle relative to the airflow) and powered down. In this manner, the VTOL UAS 100 may realize a greater endurance through only two of the three power pods receiving power from the battery source. For continued pitch and yaw control, the vertical vectored thrust vanes 146 and/or canard elevators may continue to operate with or without the control power pod 144 providing thrust.

In one embodiment, the center wing 110 may be securely coupled with the left forward duct 126A and the right forward duct 136A, while the left foldable wing 120 may be securely coupled with the left aft duct 126B and the right foldable wing 130 may be securely coupled with the right aft duct 136B. In this manner, a rotation moment between the center wing 110 and each of the left and right foldable wings 120 and 130 may be the plane joining the forward ducts 126A and 136A to the aft ducts 126B and 136B.

For example, a geared system within the right duct may operate to rotate the right aft duct 136B relative to the right forward duct 136A. In this manner, the center wing 110 and right forward duct 136A may be stationary while the right aft duct 136B, coupled securely to the right foldable wing 130, may longitudinally rotate about the longitudinal axis 250 to any angle relative to the lateral axis 252.

In additional embodiments, the VTOL UAS 100 may include a total wing area to present an aspect ratio (AR) of approximately 24 while in the powered flight configuration 200. Similar to an aspect ratio of a glider, the VTOL UAS 100 may provide sufficient endurance to perform long range sensing operations from a remote area.

Figure 3:
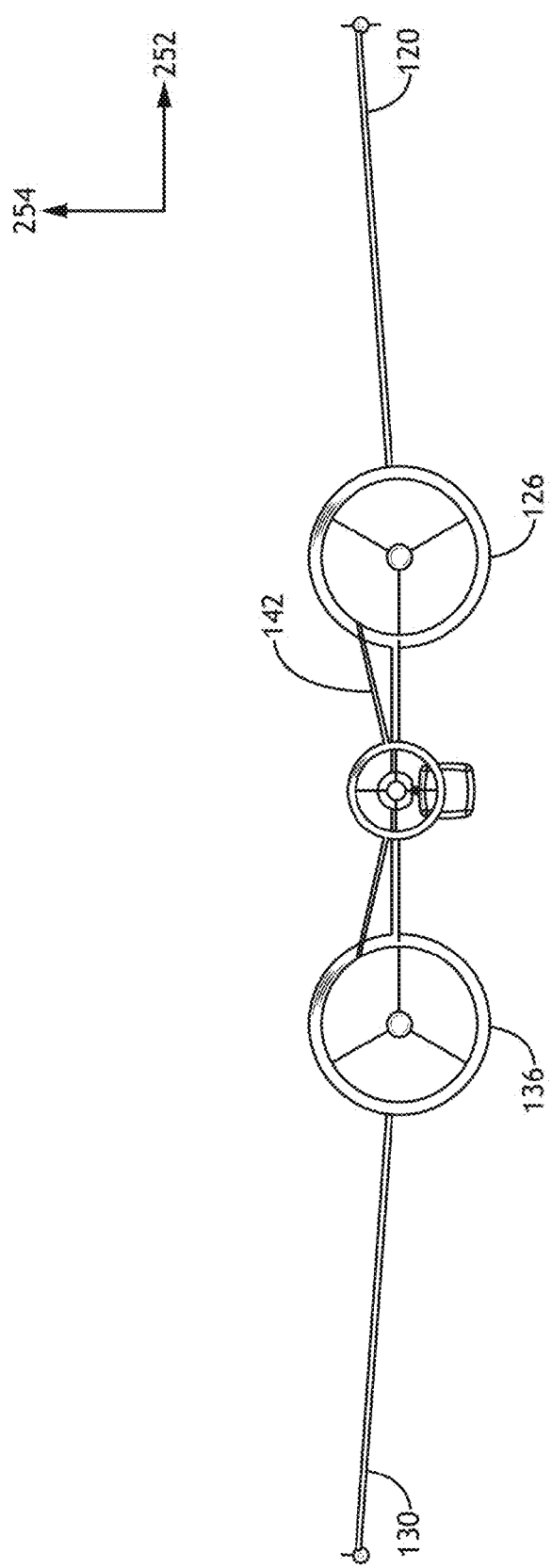
FIG. 3 is a longitudinal front view of the VTOL UAS in a powered flight configuration exemplary of an embodiment of the inventive concepts disclosed herein.

Referring to FIG. 3, a longitudinal front view of the VTOL UAS in a powered flight configuration exemplary of an embodiment of the inventive concepts disclosed herein is shown. In one embodiment, the left foldable wing 120 and the right foldable wing 130 may be slightly canted in a dihedral angle vertically from the lateral axis 252. As the center wing 110 may maintain a consistent angle relative to the lateral axis 252, each foldable wing 120 and 130 may be rotated 1) level with the lateral axis and/or 2) canted dihedrally from the lateral axis 252 an optimum number of (e.g., five) degrees.

Alternatively, the VTOL UAS 100 may also perform with an anhedral angle of the left and right foldable wings 120 and 130. At the point of rotation about each power pod 126 and 136 (e.g., about the power pod stand 128), each of the foldable wings 120 and 130 may be rotated to any angle from a maximum rotation proximal to a top of the opposite power pod to minimum rotation proximal to a bottom of the opposite power pod.

The canard 142 may also preferably maintain a dihedral angle for additional stability and performance. One preferable dihedral angle for the canard 142 may be an exemplary 15 degrees. Further contemplated herein, the canard may be alternatively sized and positioned at additional angles relative to the lateral axis 252 for optimum performance for variable payload weights and types.

Figure 4:
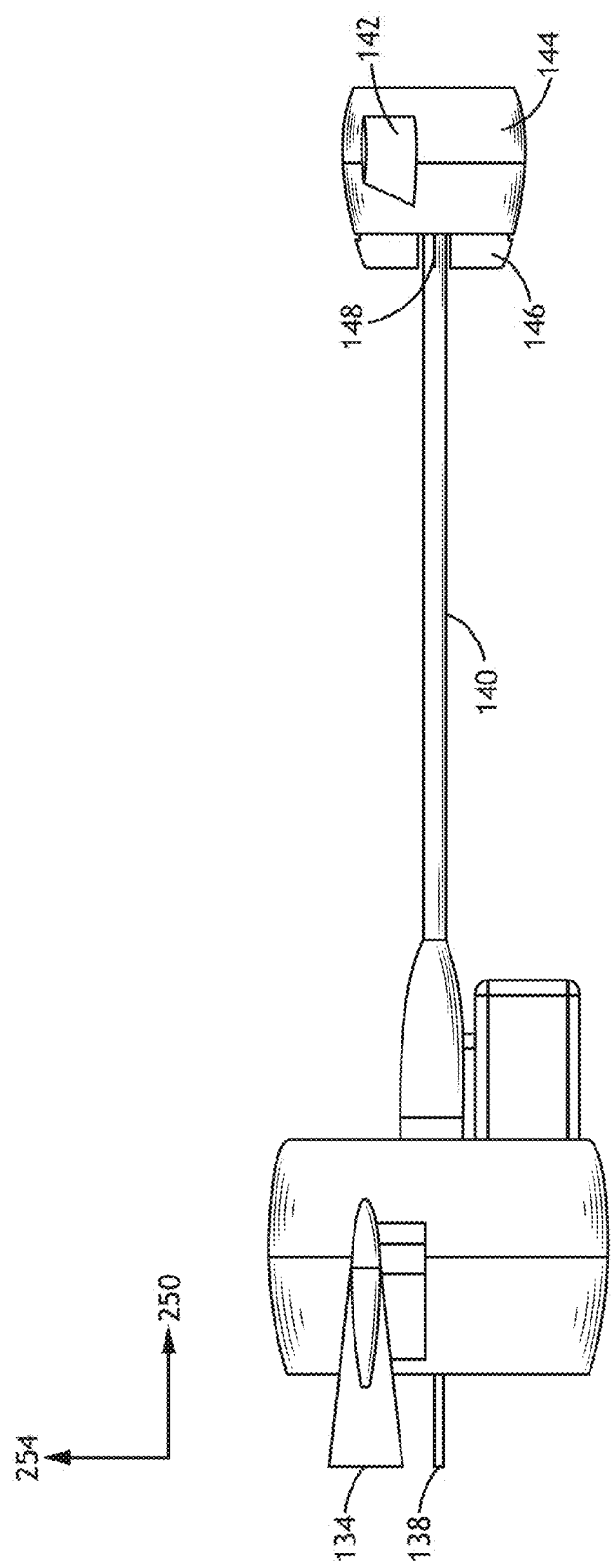
FIG. 4 is an lateral view a VTOL UAS in a powered flight configuration exemplary of one embodiment of the inventive concepts disclosed herein.

Referring to FIG. 4, a lateral view a VTOL UAS in a powered flight configuration exemplary of one embodiment of the inventive concepts disclosed herein is shown. Here, the right power pod stand 138 and the right wingtip stand 134 may be clearly visible and indicated at an equal longitudinal extension aft of the trailing edge of each control surface and power pod. Also the vertical vectored thrust vanes 146 aligned with a vertical axis 254 and horizontal vectored thrust vanes 148 aligned with the lateral axis 252 may be indicated coupled with a trailing edge of the control power pod 144.

In one embodiment, the universal attachment 150 (not shown) may be a fixed joint between the canard boom 140 and the control power pod 144. In this manner, the vertical vectored thrust vanes 146 and horizontal vectored thrust vanes 148 may provide the vectored thrust provided by the control power pod 144. The vertical vectored thrust vanes 146 and horizontal vectored thrust vanes 148 deflect the outgoing air in a direction opposite to a desired movement of the control power pod 144. The vertical vectored thrust vanes 146 and horizontal vectored thrust vanes 148 may be controlled by servo-mechanisms.

Figure 5:
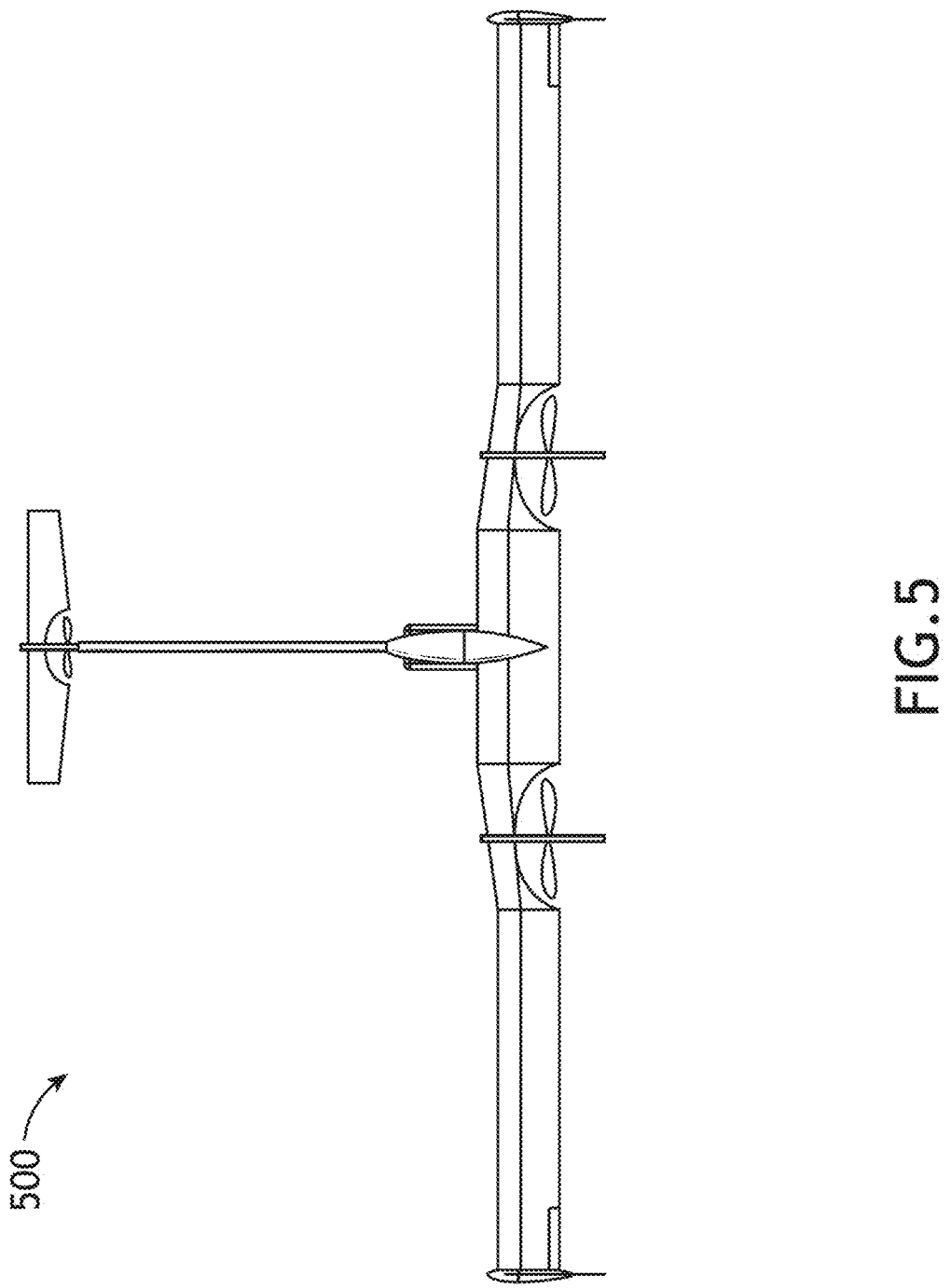
FIG. 5 is a vertical view of a VTOL UAS in a powered flight configuration in accordance with one embodiment of the inventive concepts disclosed herein.

Referring to FIG. 5, a vertical view of a VTOL UAS in a powered flight configuration in accordance with one embodiment of the inventive concepts disclosed herein is shown. An un-ducted propeller configuration 500 may provide the VTOL UAS 100 with additional flexibility. Reduced weight and reduced drag in the un-ducted configuration 500 may allow increased performance and additional endurance.

Figure 6:
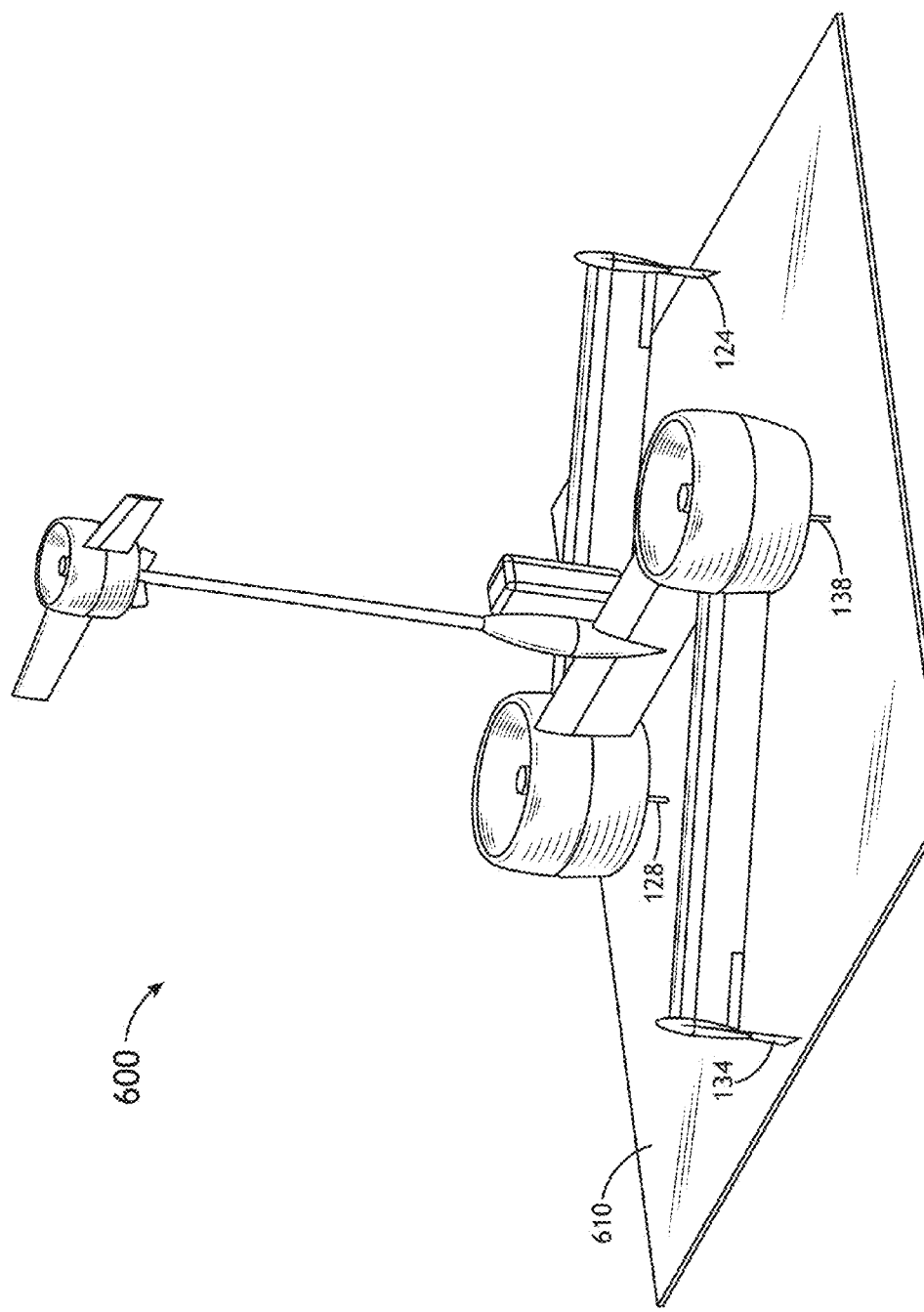
FIG. 6 is a diagram of a VTOL UAS in a VTOL configuration in accordance with one embodiment of the inventive concepts disclosed herein.

Referring to FIG. 6, a diagram of a VTOL UAS in a VTOL configuration in accordance with one embodiment of the inventive concepts disclosed herein is shown. In the VTOL configuration 600, each of the left foldable wing 120 and the right foldable wing may be rotated about the longitudinal axis 250 to a the VTOL configuration 600 to 1) provide a stable platform for the VTOL UAS 100 to contact a landing surface 610, 2) reduce the wing area which is susceptible to cross wind disturbance while flying the VTOL flight regime, and 3) place each of the wing stands 124 and 134 and a left power pod stand 128 and a right power pod stand 138 in a minimum form factor for landing on small landing surfaces 610.

Coupled to a trailing edge of each of the left and right power pods 126 and 136, the left and right power pod stands 128 and 138 may operate in cooperation with the left wingtip stand 124 and the right wingtip stand 134 as landing points for stability while the VTOL UAS 100 is unpowered in the VTOL configuration 600 and stationary on the landing surface 610 before a vertical takeoff and after a vertical landing. Each of the stands 124, 134, 128 and 138 may be varied in length to ensure adequate thrust is available while the VTOL UAS is ready for launch.

Figure 7:
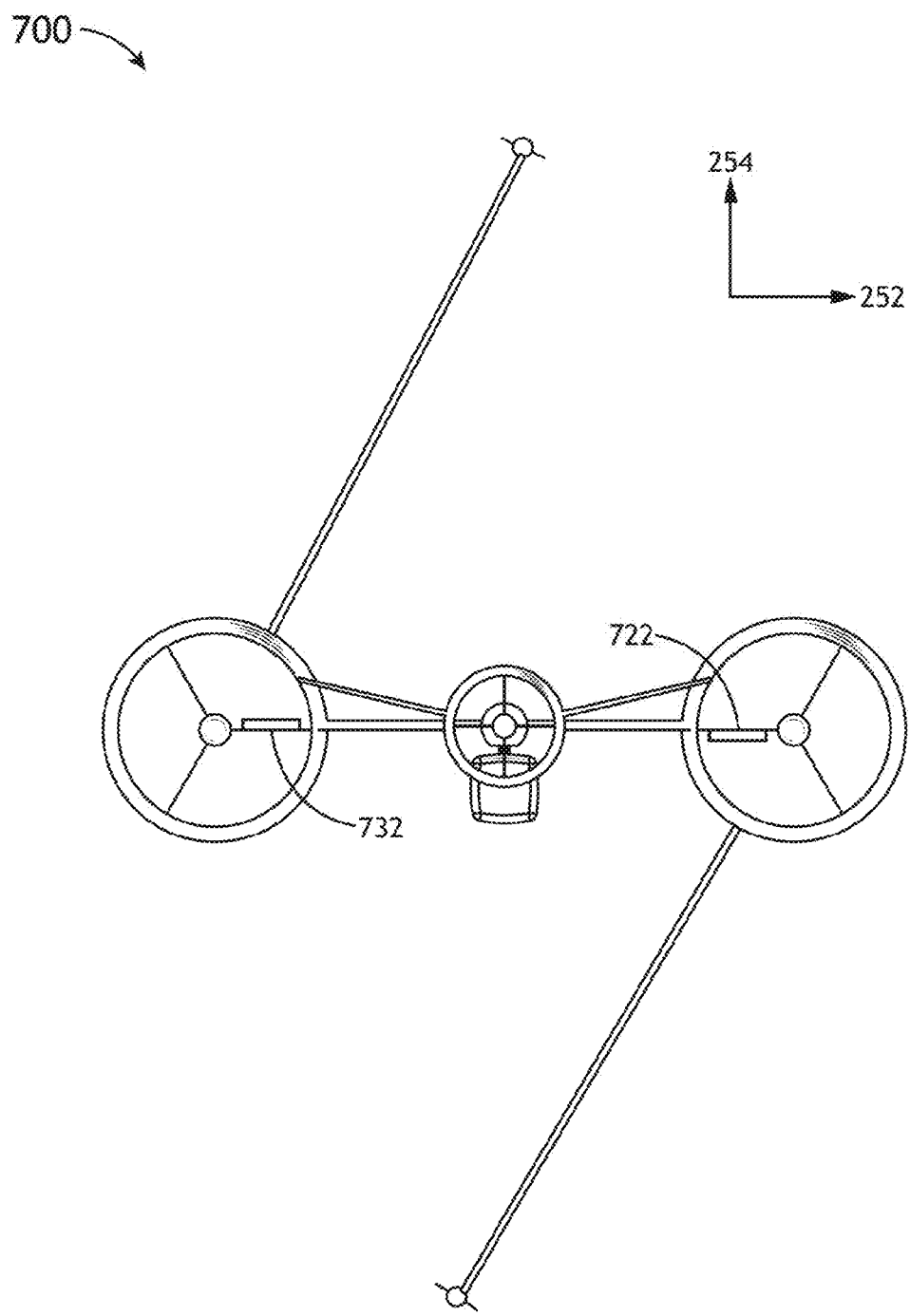
FIG. 7 a front view of a VTOL UAS in a VTOL configuration associated with one embodiment of the inventive concepts disclosed herein.

Referring to FIG. 7, a front view of a VTOL UAS in a VTOL configuration associated with one embodiment of the inventive concepts disclosed herein is shown. In embodiments, a vertical view 700 of the VTOL configuration 600 may be shown as the left and right foldable wings 120 and 130 folded at an angle of approximately 120 degrees away from the lateral axis 252. In this manner, each of the wingtip stands 124 and 134 and the power pod stands 128 and 138 may provide the VTOL UAS 100 a stable platform on which to rest unpowered on the landing surface 610.

In one embodiment, the VTOL configuration 600 may be defined by the vertical axis 254 alignment of the left wingtip stand 124, the fuselage 112, and the right wingtip stand 134. In additional embodiments, the left and right foldable wings 120 and 130 may be folded to any angle away from the lateral axis 252 offering sufficient stability as the VTOL UAS 110 may land or launch from the landing surface 610.

During VTOL flight in the VTOL configuration 600, each of the left and right power pods 126 and 136 and the control power pod 144 may provide all of the lift as vertical vectored thrust for steady state flight during a VTOL climb to a transition altitude and during a descent to the surface for landing. Preferably, the VTOL flight regime may comprise a nose up attitude of approximately 90 degrees (FIG. 7) while the VTOL UAS 100 climbs away from (or tail slides toward) the landing surface 610.

In the VTOL flight regime, the VTOL UAS 100 may be limited in a roll capability. Should roll be desired, an opposite deflection of the vertical vectored thrust vanes 146 and the horizontal vectored thrust vanes 148 may enable the VTOL UAS 100 a limited amount of roll capability and stability. As airspeed increases, the ailerons may also provide a suitable roll moment even though the VTOL UAS is in the VTOL configuration 600.

In one embodiment, a left ducteron 722 and a right ducteron 732 may be positioned in the downstream airflow of each of the left power pod 126 and the right power pod 136. Ducterons 722 and 732 may aid in providing roll control in situations where the control power pod 144 is articulated on a universal joint and moved by small "servo tabs" and may not provide the needed roll control outlined above.

The control power pod 144 may operate to provide vectored thrust for pitch and yaw stability while the VTOL UAS 100 is in the VTOL configuration 600 flying in the VTOL flight regime. In one embodiment, the vertical and horizontal vectored thrust vanes 146 and 148 coupled to the trailing edge of the control power pod may provide vectored thrust for pitch and yaw stability. Here, the vertical and horizontal vectored thrust vanes 146 and 148 may direct the thrust as desired by the operator (or autopilot) to provide yaw control as well as pitch control and stability in the VTOL configuration 600.

During the climb from the landing surface to a transition altitude, the left foldable wing 120 and the right foldable wing may rotate about the longitudinal axis 250 from the VTOL configuration 600 to the powered flight configuration 200. It is contemplated herein that an autopilot may direct the transition based on a plurality of factors including a minimum Above Ground Level (AGL) altitude as well as an operator directed manual transition from the VTOL configuration 600 to the powered flight configuration 200.

During takeoff, the VTOL UAS 100 may be stationary on the landing surface 610 in the VTOL configuration 600. Each of the power pods may provide thrust necessary (greater than the VTOL UAS 100 weight) for the VTOL UAS 100 to climb in the VTOL flight regime to the transition altitude.

Transition altitude may be defined as the AGL altitude required for the VTOL UAS 100 to maneuver from the VTOL flight regime to the powered flight regime. In embodiments, the VTOL UAS 100 may climb in the VTOL flight regime to the transition altitude to 1) achieve the AGL altitude for the transition from the VTOL to powered flight regime, and 2) achieve an AGL altitude to remain clear of obstacles posing a danger to the VTOL UAS 100.

At the transition altitude, the VTOL UAS 100 may transition from the VTOL flight regime to the powered flight regime with a gradual change in pitch from vertically nose up to nose level on the horizon as airspeed increases. As power may be altered to achieve a maximum desired performance (endurance and speed), the power level available to the VTOL UAS 100 at the transition altitude may directly impact the nose position required during the transition. In embodiments, an altitude loss of zero may be experienced during the transition from the VTOL flight regime to the powered flight regime. Alternatively, the VTOL UAS 100 may execute a continuous climb to gain airspeed and transition to the powered flight regime.

In one embodiment to transition from the VTOL flight regime to the powered flight regime, the VTOL UAS 100 may direct the vectored thrust from the control power pod 144 to aggressively pitch nose over from a nose up attitude to a nose down attitude. This aggressive nose over maneuver may be a resultant combination of vectored thrust from the control power pod 144 as well as a deflection of each aileron in the same direction. In embodiments, the vectored thrust may be aggressively applied to pitch the VTOL UAS 100 over to the nose down attitude followed by a counter vectored thrust applied to stop the pitch moment while approaching the desired nose down attitude for acceleration. This maneuver may position the VTOL UAS 100 at the precise nose down attitude for acceleration to the powered flight regime.

As the VTOL UAS 100 may maintain the nose down attitude in the VTOL flight regime, airspeed may rapidly increase to that required for the powered flight regime. In embodiments, the nose down attitude may be approximately 45 to 60 degrees nose down. Once the VTOL UAS 100 reaches a flying airspeed, it may apply the vectored thrust to position the canards to transition the VTOL UAS 100 from the nose down attitude to a level flight attitude to maintain a desired AGL altitude and preclude the VTOL UAS 100 from ground impact.

In embodiments, one sequence may include a stationary VTOL UAS 100 on the landing surface 610, an application of power to each of the three power pods, a climb from zero AGL to a hover just above (e.g., one foot) the landing surface 610, a transition from the VTOL configuration 600 to the powered flight configuration 600, and a nose down application of vectored thrust at the control power pod 144 to increase airspeed from near zero to above the stall speed required for the powered flight regime, and powered flight in the powered flight configuration 200.

Once a mission is complete, the VTOL UAS 100 may transition from the powered flight configuration 200 to the VTOL configuration 600. A transition from the powered flight configuration 200 to the VTOL configuration 600 may comprise a plurality of events to ensure the VTOL UAS 100 remains in controlled flight at all times during the transition.

In one embodiment, to transition from the powered flight configuration 200 to the VTOL configuration 600, each of the left foldable wing 120 and the right foldable wing 130 may longitudinally rotate in a counter clockwise direction looking forward along the longitudinal axis 250 of the VTOL UAS 100. In an additional embodiment, each of the left and right foldable wings may rotate either both clockwise, both counter clockwise, or individually in either direction to enable the VTOL UAS 100 to transition from the powered flight configuration 200 to the VTOL configuration 600.

As the VTOL UAS 100 approaches the landing surface 610, the VTOL UAS 100 may aggressively pitch up to a vertical nose up attitude. This vertical nose up attitude may deeply stall the canard resulting in a vertical nose up attitude where the thrust of the power pods 126, 136, and 144 may take over as the source of lift for the VTOL UAS 100. With the thrust of the three power pods available, the VTOL UAS 100 may tail slide in a controlled VTOL configuration 600 from the altitude of the pitch up maneuver to the landing surface 610. During this controlled tail slide, the left and right foldable wings may rotate to the VTOL configuration 600 positioning the wing stands 124 and 134 in the proper position for stability on the landing surface.

In additional embodiments, the VTOL UAS 100 may be pitched to a nose up attitude (e.g., 90 degrees nose up) and the airspeed is allowed to bleed off to zero where the thrust of the power pods 126, 136, and 144 may then take over to provide the lift.

In additional embodiments, the onboard autopilot may direct the VTOL UAS 100 in all aspects of each flight regime. An operator may enter (or transmit to the VTOL UAS 100) coordinates of the landing surface 610 and the onboard autopilot may direct the VTOL UAS 100 through each transition from takeoff to landing.

In an additional embodiment, the VTOL UAS 100 may be launched in the powered flight configuration from a hand held launch, catapult, and via additional removable wheels. Also, the VTOL UAS 100 may be landed as a traditional aircraft from the powered flight configuration should the requirements of an operator or a mechanical malfunction require such a landing.

Figure 8:
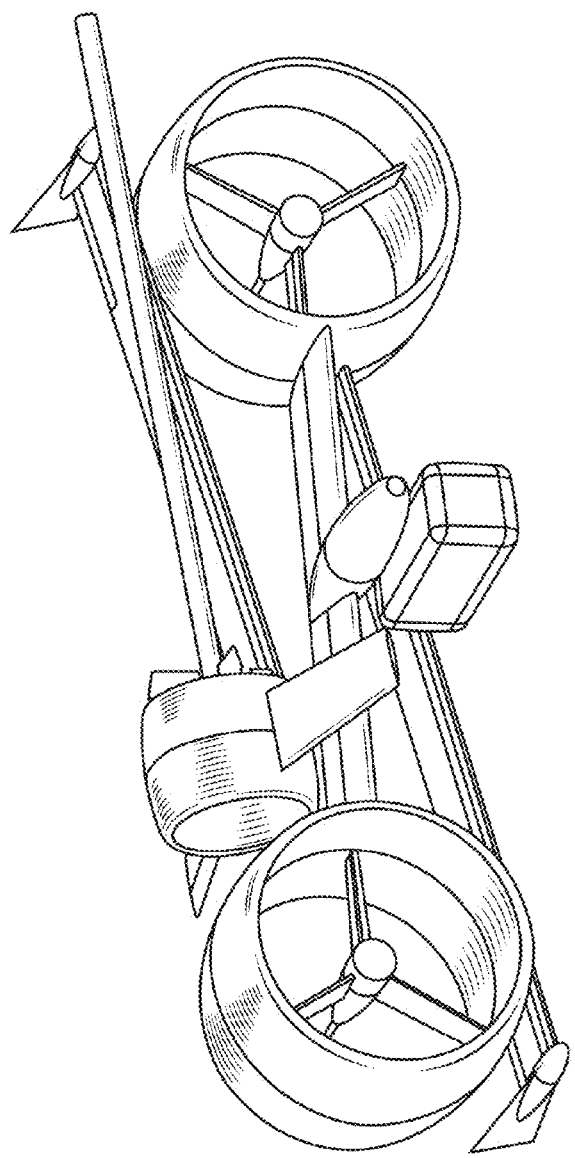
FIG. 8 is a diagram of a VTOL UAS in a disassembled configuration exemplary of one embodiment of the inventive concepts disclosed herein.

Referring to FIG. 8, a diagram of a VTOL UAS in a disassembled configuration exemplary of one embodiment of the inventive concepts disclosed herein is shown. In the disassembled configuration 800, each of the left and right foldable wings 120 and 130 may continue to longitudinally rotate to a transport configuration for minimum form factor transport. In this transport configuration, each of the left and the right foldable wings 120 and 130 may contact the opposite power pod presenting a minimal form factor.

In embodiments, the control power pod 144 may be removable at a coupling between the fuselage 112 and the canard boom 140. In this manner, the size of the VTOL UAS 100 in the disassembled configuration 800 may be limited by the longest member (here, the left and right foldable wings).

Figure 9:
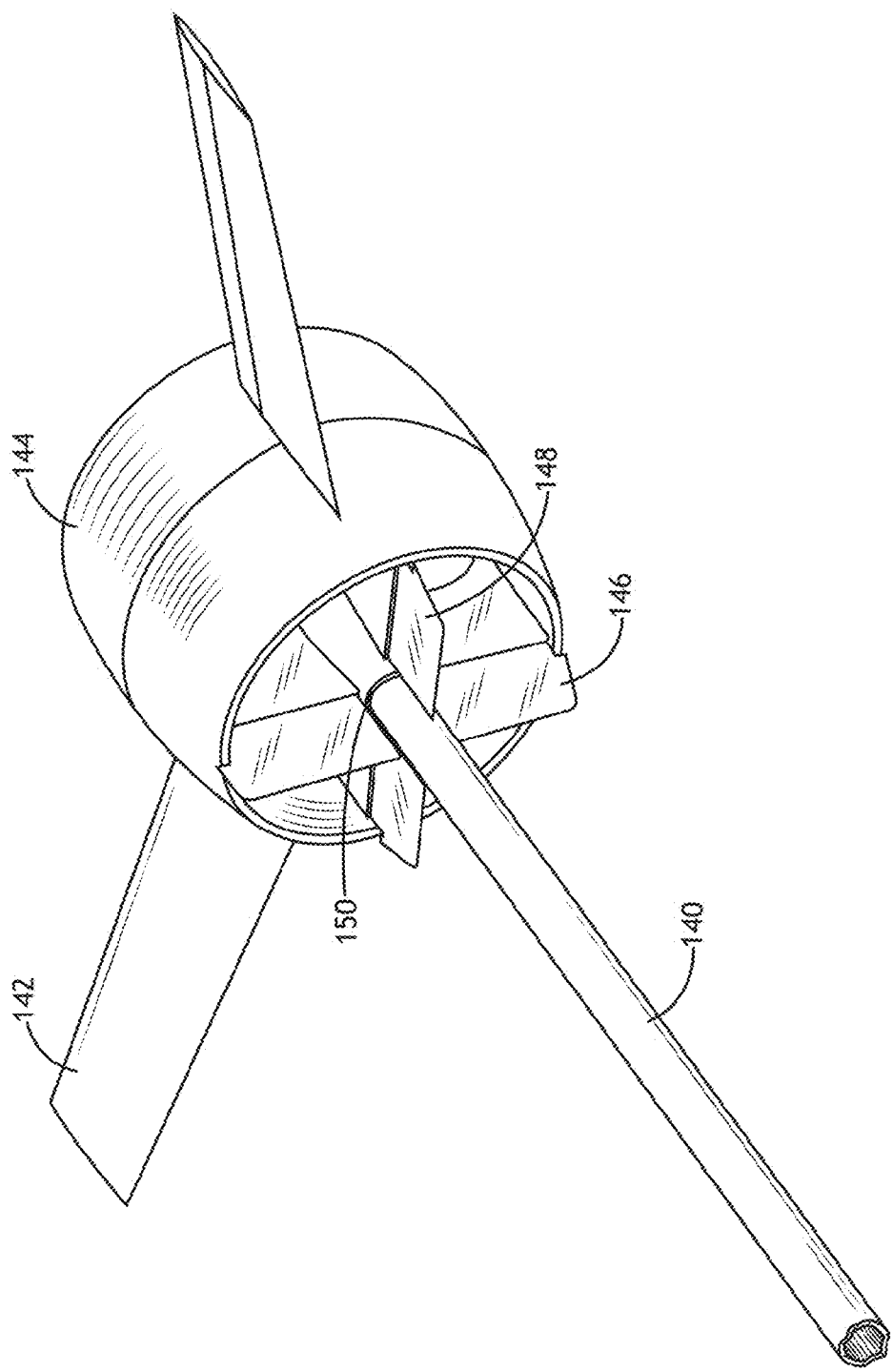
FIG. 9 is a diagram of a control power pod exemplary of one embodiment of the inventive concepts disclosed herein.

Referring to FIG. 9, a diagram of a control power pod exemplary of one embodiment of the inventive concepts disclosed herein is shown. The control power pod 144 may include the vertical vectored thrust vanes 146 and the horizontal vectored thrust vanes 148 configured to vector the thrust of the control power pod 144 in all directions. As the universal attachment 150 may allow the control power pod 144 to pivot relative to the canard boom 140, each deflection of the vectored thrust vanes 146 and 148 may also induce a change in the angle of the control power pod 144 relative to the longitudinal axis 250.

This induced change may further direct the thrust from the control power pod 144 to further control pitch and yaw.

Figure 10B:
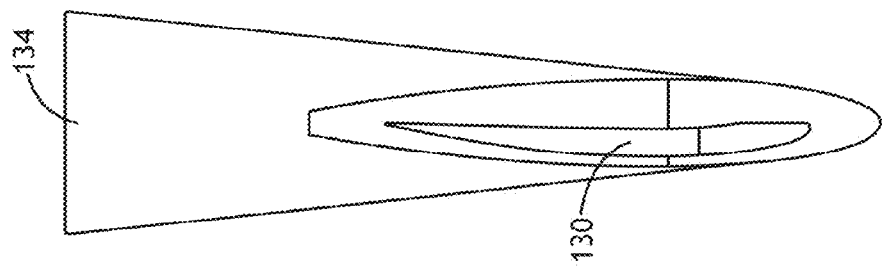
FIGS. 10A and 10B are diagrams of right wing associated with one embodiment of the inventive concepts disclosed herein.
Figure 10A:
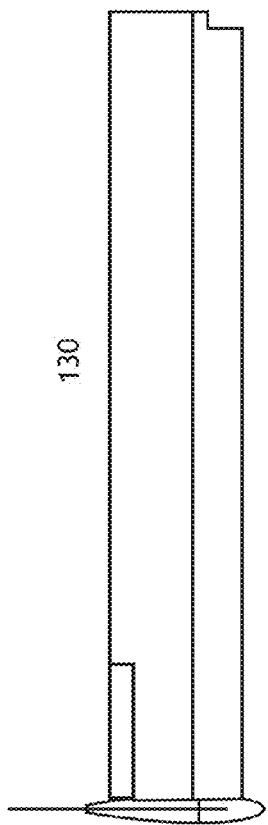

Referring to FIGS. 10A-B, diagrams of right wing associated with one embodiment of the inventive concepts disclosed herein is shown. In one embodiment, the size of the right foldable wing 130 may include a Mean Aerodynamic Chord (MAC) of six inches and a wing length of 36 inches measured from the right power pod 126 to the right wing stand 134.

In an additional embodiment, an airfoil usable on the VTOL UAS 100 center wing 110, left foldable wing 120 and right foldable wing 130 may include an airfoil having a max thickness of approximately 7.3% (of the MAC) at approximately 30% chord and a max camber of approximately 3.9% MAC at approximately 45% chord. Additional sizes and dimensions of wing airfoils and aspect ratios may be inclusive to the design of the VTOL UAS are contemplated within the scope of the present invention.

Figure 11B:
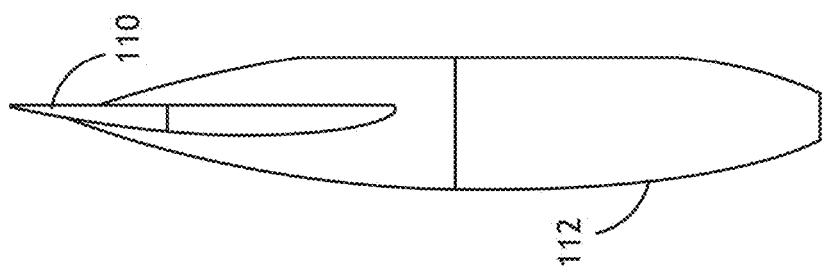
FIGS. 11A and 11B are diagrams of a fuselage and center wing in accordance with one embodiment of the inventive concepts disclosed herein.
Figure 11A:
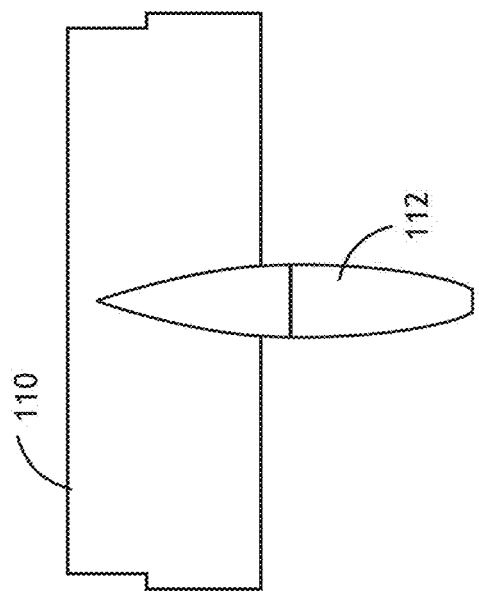

Referring to FIGS. 11A-B, diagrams of a fuselage and center wing in accordance with one embodiment of the inventive concepts disclosed herein is shown. The fuselage 112 may be aerodynamically shaped to offer a low drag support for the canard boom 140 as well as an attachment point for the payload 114. Additionally in some embodiments, the fuselage 112 may be of sufficient size to incorporate each of the battery source, the sensor systems previously found in the payload pod 114, and micro avionics precluding the need for a high drag payload pod 114. A quick disconnect conformal battery within the fuselage 112 may operate to provide sufficient power for the VTOL UAS 100 as well as limit the drag induced through an additional external payload pod 114.

Figure 12B:
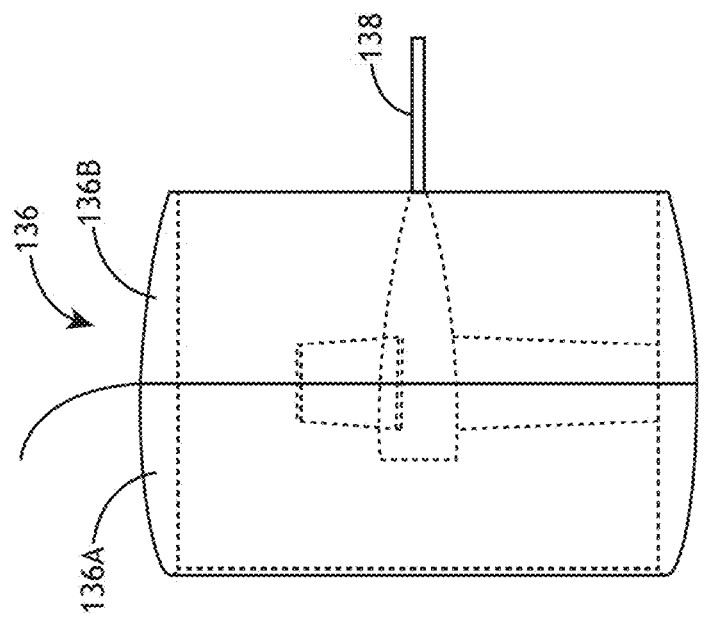
FIGS. 12A and 12B are diagrams of a power pod and associated fan in accordance with one embodiment of the inventive concepts disclosed herein.
Figure 12A:
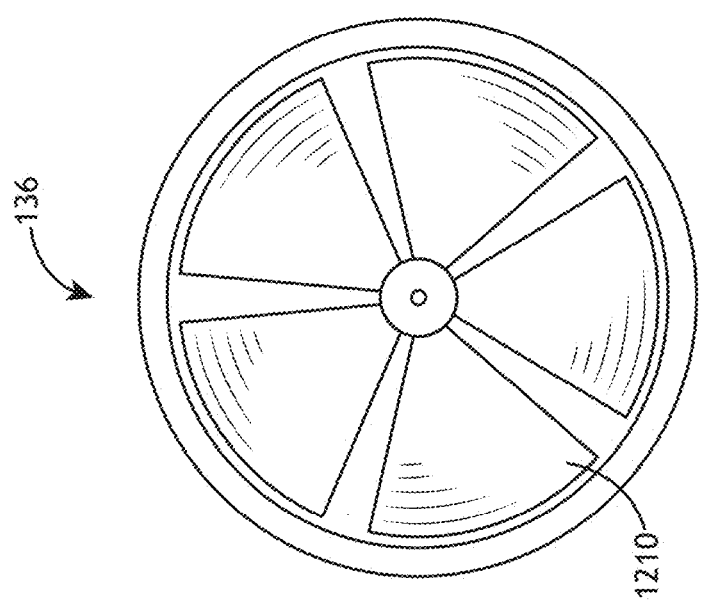

Referring to FIGS. 12A-B, diagrams of a power pod and associated fan in accordance with one embodiment of the inventive concepts disclosed herein is shown. In one embodiment, ducted propellers may operate as the left and right power pods 126 and 136 and the control power pod 144. A ducted fan with associated fan blades 1210 may provide the thrust necessary for the VTOL UAS 100 to maximize performance. As maximum efficiency may be one goal of the VTOL UAS 100, a ducted propeller design may provide a small amount of increased drag because of the duct while greatly increasing the efficiency of the ducted fan.

In embodiments, each of the left and right power pods 126 and 136 may enclose counter rotating propellers to aid in roll stability during the VTOL flight regime. In addition, each of the ducts of the left 126, right 136, and control power pods 144 may be specifically configured to operate as airfoils capable of producing lift during the powered flight regime. In this manner, an efficient use of each of the surfaces of the VTOL UAS 100 may increase overall flight efficiency and endurance.

Further, the ducts may operate as a measure of safety for potential operators of the VTOL UAS 100. As some potential operators may be novice UAS operators or forward deployed, keeping the operator safe from high speed propellers may be one additional safety aspect of the VTOL UAS 100.

Each of the left and right power pods 126 and 136 may maintain a split duct configuration where one stationary portion 136A of the split duct is coupled with the center wing 110 while a rotatable portion 136B of the split duct is coupled with the rotatable outer wing 130. The rotatable portion 136B of the split duct may rotate about a longitudinal axis 250 of the VTOL UAS 100 to enable the right foldable wing 130 (and the left 120) to also rotate with the rotatable portion of the split duct to and from the VTOL configuration 600, the powered flight configuration 200 and the disassembled configuration 800. In one embodiment, the split duct arrangement may be reversed so that right foldable wing 130 is attached to the right forward duct 136A and the center wing 110 is attached to the right aft duct 136B etc.

Figure 13B:
FIGS. 13A and 13B are diagrams of a canard in accordance with one embodiment of the inventive concepts disclosed herein.
Figure 13A:
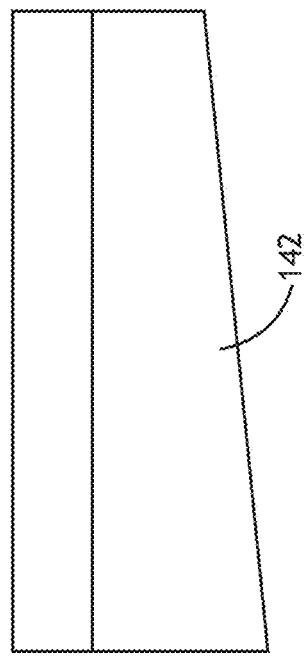

Referring to FIGS. 13A-B, diagrams of a canard in accordance with one embodiment of the inventive concepts disclosed herein is shown. The canard 142 may maintain a plurality of sizes and angles to maximize the performance of the VTOL UAS 100. As FIG. 13B may detail a symmetric airfoil, it is contemplated herein that a lifting airfoil may be incorporated within the scope of this invention. In the powered flight configuration 200, the VTOL UAS 100 may be configured for lift production in as many areas as possible including the canard 142, the control power pod 144 and the canard boom 140.

Referring to FIGS. 14A-C, views of a control power pod and associated vectored thrust devices in accordance with one embodiment of the inventive concepts disclosed herein is shown. In embodiments, the control power pod 144 may be configured with internal stationary vanes with vectored thrust vanes in the horizontal 148 and vertical 146 for vectoring the thrust of the control power pod 144.

Also, servo tabs 1446 and 1448 may be incorporated with the trailing edge of the vectored thrust vanes for additional control of the vectored thrust. As a servo tab 1446 may be deflected, the aft position of the servo tab may deflect the vectored thrust vane 146 thus deflecting the entire control power pod 144 about the universal attachment 150. This deflection of the control power pod 144 may provide the vectored thrust (pitch, yaw or a combination thereof) at a desired angle from the longitudinal axis 250. Also, as the canard 142 is securely coupled with the control power pod 144 duct, the canard 142 and the servo tabs 1446 may operate in concert to provide additional pitch and yaw moment while the VTOL UAS 100 is in the powered flight regime. As minimum weight is one goal of the VTOL UAS 100, a small servo tab may be one desirable aspect of the vectored thrust.

As the servo tabs 1446 and 1448 may provide vectored thrust and stability during the powered flight regime, each of the ducts may also operate to provide a level of yaw stability during the powered flight regime. In the VTOL flight regime, the servo tabs 1446 and 1448 may also provide the vectored thrust capability for yaw pitch and roll.

In an additional embodiment, the VTOL UAS 100 may employ the plurality of articulating servos internal to the canard boom 140 attached to the control power pod 144. The plurality of servos may be configured to act upon the control power pod 144 to displace the control power pod 144 from the longitudinal axis 250 and direct the thrust of the control power pod 144 at any desired angle from the longitudinal axis 250.

Figure 15B:
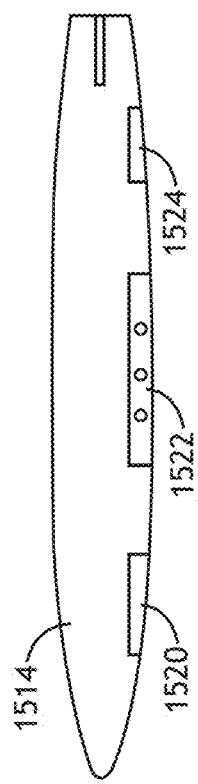
FIGS. 15A and 15B are diagrams of a payload pod associated with one embodiment of the inventive concepts disclosed herein.
Figure 15A:
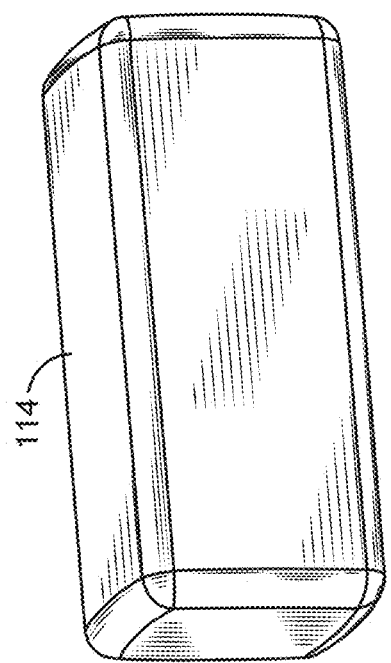

Referring to FIGS. 15A-B, diagrams of a payload pod associated with one embodiment of the inventive concepts disclosed herein is shown. The removable payload pod 114 coupled with the fuselage 112 may operate as one of a plurality of functional missions of the VTOL UAS 100. In one embodiment, a sensor payload pod 114 may be removably coupled with the fuselage 112 for aerial sensing, aerial photography and aerial videography. A transmission means may also be included within the payload pod 114 for transmission of data to a remote station for follow on processing. In an additional embodiment, the removable payload pod 114 may provide a battery source for operation of the VTOL UAS 100.

In one embodiment, the removable payload pod 114 may be positioned forward or aft to change the center of gravity (CG) of the VTOL UAS 100 for a desired performance. For example, an aft CG may aid in long range endurance as well as pitch up for the transition from the powered flight regime to the VTOL flight regime prior to landing, while a more forward CG may aid in a pitch down for the transition from VTOL to powered flight. Another benefit of the canard configuration is that now the canard-pod assembly will not only provide a control function but, additionally, but the canard-pod may be capable of supporting some of the payload weight. Therefore, the induced drag of this assembly actually does some useful work.

Additionally, depending on the length of the canard boom 140, the area of the canard surfaces and the canard's incidence with respect to the wing, the CG may be positioned ahead of the leading edge of the center wing 110. This forward CG may allow the canard to provide useful lift and hence share some of the load. In this manner, the removable payload pod 1514 may be shifted forward to optimize the useful lift of the canard. In embodiments, the removable payload pod 1514 may be dynamically shifted forward and aft for optimum location for the CG and thus, optimum performance of the VTOL UAS.

Referring to FIG. 15B, the removable payload pod 1514 may be aerodynamically configured to decrease drag associated with the carriage of an external store. Additionally, a suite of micro avionics may be included in the payload pod 1514 for reception of a control signal and transmission of commands to each of the control surfaces. In some embodiments, the micro avionics may include a plurality of accelerometers, gyros, pressure and temperature sensors, and autopilots to ensure continuous stability of the VTOL UAS 100 in each flight regime. The micro avionics may also include a Global Navigation Satellite System (GNSS) receiver to provide continuous positioning capability while a memory and processor associated with the micro avionics may provide commands to the VTOL UAS 100 for self-controlled flight in each regime.

Also, a ground sensing capability during both powered flight as well as VTOL flight regimes may provide the VTOL UAS 100 continuous awareness of the current AGL altitude. The ground sensing capability may be configured to determine the AGL altitude of the VTOL UAS 100 whether in the powered flight configuration in level flight or in the VTOL configuration in a nose up attitude. Conversely, the micro avionics and power source may be sited in the fuselage 112 for operation of the VTOL UAS 100 with or without the removable payload pod 114.

The payload pod aerodynamic 1514 may also include a removable battery pack 1520 configured for ease of removal and quick replacement of a fully charged removable battery pack 1520. Also, a sensor pack 1522 may provide the VTOL UAS 110 with a plurality of sensor types to perform a plurality of missions. For example, on sensor type incorporated with the removable sensor pack may include an infrared (IR) sensor while another sensor type may include a charge coupled device (CCD) sensor.

Additionally, a removable alternate pack 1524 may be specifically configured for an operational mission as required by a specific operator. For example, an agriculture operator may be interested in a weather sensor configured for sensing an ambient pressure, temperature and humidity level while a pipeline operator may be interested in a gaseous natural gas or propane sensor.

Additionally, the canard boom 140 may be constructed of a material suitable for signal transmissivity. The removable sensor pack 1522 and alternate pack 1524 may be sited to actively transmit signals and or passively receive signals in a 360 degree azimuth about the longitudinal axis. For example, a 360 degree sensor may sense a lightning strike above, below, left or right of the VTOL UAS 100 to more accurately enable the VTOL UAS to sense the desired detail of data.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

Skilled artisans will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the true spirit and scope of the subject matter described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

What is claimed is:

1. A vertical takeoff and landing unmanned aircraft system (VTOL UAS), comprising:
    a center wing including a fuselage, the fuselage configured for receiving and removably coupling with a removable payload pod;
    a left power pod coupled to a left tip of the center wing, the left power pod having a left power pod stand;

a right power pod coupled to a right tip of the center wing, the right power pod having a right power pod stand;

a left foldable wing rotatably coupled to the left power pod, the left foldable wing having a left wing stand coupled with a left wing tip of the left foldable wing, the left foldable wing including a left aileron;

a right foldable wing rotatably coupled to the right power pod, the right foldable wing having a right wing stand coupled with a right wing tip of the right foldable wing, the right foldable wing including a right aileron;

the VTOL UAS having a lateral axis, a vertical axis and a longitudinal axis;

a trailing edge of each of the left wing stand, the right wing stand, the left power pod stand and the right power pod stand being longitudinally equal;

a canard boom removably coupled to a leading edge of the fuselage;

a control power pod coupled with a leading edge of the canard boom, the control power pod configured for vectoring a thrust produced by the control power pod;

the left power pod, the right power pod, and the control power pod configured for providing a combined thrust greater than the weight of the VTOL UAS;

the canard boom extending longitudinally from the fuselage to the control power pod;

a canard coupled with the control power pod;

the VTOL UAS configured for a powered flight regime in a powered flight configuration, the powered flight configuration a substantially linear lateral wing configuration including a substantially linear lateral alignment of the center wing, the left foldable wing and the right foldable wing along the lateral axis;

the VTOL UAS configured for a VTOL flight regime in a VTOL configuration, the VTOL configuration including a folded wing configuration wherein each of the left foldable wing and the right foldable wing is rotated in an equal clock direction about the longitudinal axis to an angle in which the left wing stand and the right wing stand substantially align with the fuselage along the vertical axis;

the VTOL UAS configured for maintaining:
- a stationary nose up position on a landing surface while in the VTOL configuration;
- a takeoff in the VTOL flight regime while in the VTOL configuration;
- a steady state hover in the VTOL flight regime;
- a transition from the VTOL configuration to the powered flight configuration during the takeoff;
- a transition from the VTOL flight regime to the powered flight regime;
- a steady state flight in the powered flight regime;
- a transition from the powered flight regime to the VTOL flight regime;
- a transition from the powered flight configuration to the VTOL configuration; and
- a landing in the VTOL flight regime while in the VTOL configuration.

2. The VTOL UAS of claim 1, wherein each of the left power pod, the right power pod, and the control power pod are comprised of one of a ducted fan and a ducted propeller engine enclosed within a cylindrical duct, each cylindrical duct configured as a lifting airfoil during the powered flight regime.

3. The VTOL UAS of claim 1, wherein the left foldable wing and the right foldable wing have a mean aerodynamic chord (MAC) of approximately six inches, the center wing has a MAC of approximately eight inches, and each of the left and right foldable wings and the center wing is comprised of a an airfoil having a thickness of approximately 7.3% MAC at approximately 30% chord and a maximum camber of approximately 3.9% MAC at approximately 45% chord.

4. The VTOL UAS of claim 1, wherein the center wing, the left foldable wing, and the right foldable wing present a high aspect ratio of one of greater than 20 and approximately 24 while in the powered flight configuration.

5. The VTOL UAS of claim 1, wherein the powered flight regime includes lift produced by the left foldable wing, the right foldable wing, and the center wing and further includes thrust produced by each of the left power pod, the right power pod and the control power pod, and wherein the VTOL flight regime includes vertical thrust and lift produced by each of the left power pod, the right power pod and the control power pod.

6. The VTOL UAS of claim 1, further including at least four vectored thrust vanes coupled to a trailing edge of the control power pod and configured for powered displacement to vector the thrust from the control power pod, and further including at least one ducteron coupled to a trailing edge of each of the left power pod and the right power pod.

7. The VTOL UAS of claim 1, wherein the control power pod is articulatingly coupled with the leading edge of the canard boom and is configured for angular displacement from the longitudinal axis of the VTOL UAS.

8. The VTOL UAS of claim 7, wherein the control power pod articulatingly coupled with a leading edge of the canard boom further includes at least four vectored thrust vanes coupled to a trailing edge of the control power pod and configured for powered displacement to angularly displace the control power pod from the longitudinal axis to 1) vector the thrust from the control power pod, and 2) change an angle of attack of the canard.

9. The VTOL UAS of claim 7, wherein the control power pod articulatingly coupled with a leading edge of the canard boom further includes at least four servo tabs integrated with a trailing edge of the at least four vectored thrust vanes, the at least four servo tabs configured to displace the at least four vectored thrust vanes.

10. The VTOL UAS of claim 7, wherein the control power pod coupled with a leading edge of the canard boom further includes a powered articulating system configured for angularly displacing the control power pod from the longitudinal axis.

11. The VTOL UAS of claim 1, further including an autopilot configured for receiving an input from at least one of an offboard controller, an onboard memory and processor, an onboard pitot static system, an onboard positioning system, and an onboard accelerometer, the autopilot further configured for controlling the thrust of each of the power pods, displacing each of the ailerons and one or more ducterons, and displacing the control power pod and canard to maintain controlled flight in each of the powered flight regime and the VTOL flight regime.

12. The VTOL UAS of claim 1, wherein the VTOL UAS is further configured for an assisted takeoff in the powered flight configuration via at least one of a catapult device, a removable wheel configuration, a launch from a specific above ground level altitude, and a removable skid system.

13. The VTOL UAS of claim 1, further including a disassembled configuration wherein the left foldable wing and the right foldable wing are rotated about the longitudinal axis to a position proximal to the fuselage, and the canard boom removably coupled to the leading edge of the fuselage is removed.

14. A method for launching a vertical takeoff and landing (VTOL) unmanned aircraft system (UAS), comprising:
  maintaining a stationary nose up position on a landing surface while in a VTOL configuration, the VTOL configuration including a folded wing configuration wherein each of a left foldable wing and a right foldable wing is rotated in an equal clock direction about a longitudinal axis to an angle in which a left wing stand and a right wing stand substantially align with a fuselage along a vertical axis;
  launching in a VTOL flight regime while in the VTOL configuration;
  hovering while in the VTOL flight regime;
  transitioning from the VTOL configuration to a powered flight configuration during the launching, the powered flight configuration a substantially linear lateral wing configuration including a substantially linear lateral alignment of a center wing, the left foldable wing and the right foldable wing along a lateral axis;
  transitioning from the VTOL flight regime to a powered flight regime;
  maintaining a steady state flight in the powered flight regime;
  transitioning from the powered flight regime to the VTOL flight regime;
  transitioning from the powered flight configuration to the VTOL configuration; and
  landing in the VTOL flight regime while in the VTOL configuration.

15. The method for launching a VTOL UAS of claim 14, wherein the launching in a VTOL flight regime further comprises a controlled vertical takeoff using a constant thrust from a left power pod and a right power pod, and vectored thrust from a control power pod, the left power pod coupled to a left tip of the center wing, the left power pod having a left power pod stand, the right power pod coupled to a right tip of the center wing, the right power pod having a right power pod stand, and a control power pod is coupled with a leading edge of a canard boom, the control power pod configured for vectoring a thrust produced by the control power pod.

16. The method for launching a VTOL UAS of claim 14, wherein transitioning from the VTOL configuration to a powered flight configuration during the launching further comprises rotating the left foldable wing and the right foldable wing from the VTOL configuration to the powered flight configuration.

17. The method for launching a VTOL UAS of claim 15, wherein transitioning from the VTOL flight regime to a powered flight regime further comprises a nose down moment of a vectored thrust from the control power pod and an increase in airspeed from approximately zero to above a stall speed of the VTOL UAS.

18. The method for launching a VTOL UAS of claim 14, wherein transitioning from the powered flight regime to the VTOL flight regime further comprises a deep stall of the VTOL UAS and a decrease in airspeed from above the stall speed of the VTOL UAS to approximately zero.

19. The method for launching a VTOL UAS of claim 14, wherein transitioning from the powered flight configuration to the VTOL configuration further comprises rotating each of the left foldable wing and the right foldable wing from the powered flight configuration to the VTOL configuration.

20. The method for launching a VTOL UAS of claim 14, wherein landing in the VTOL flight regime while in the VTOL configuration further comprises a nose up attitude of the VTOL UAS and a nose up descent to the stationary nose up position on the landing surface.

* * * * *